United States Patent [19]
Mann

[11] Patent Number: 5,157,814
[45] Date of Patent: Oct. 27, 1992

[54] ADJUSTABLE CLAMP FOR CONDUCTORS

[75] Inventor: Steven W. Mann, Mt. Olive, Ala.

[73] Assignee: Square D Company, Palatine, Ill.

[21] Appl. No.: 762,833

[22] Filed: Sep. 19, 1991

Related U.S. Application Data

[63] Continuation-in-part of Ser. No. 710,494, Jun. 5, 1991.

[51] Int. Cl.⁵ .............................................. H01R 11/00
[52] U.S. Cl. ................................ 24/135 R; 24/136 B; 439/785
[58] Field of Search ............. 24/135 R, 135 A, 136 R, 24/136 B; 403/367, 369, 374, 409.1, 314; 248/68.1, 74.4; 439/785, 801, 804, 807

[56] References Cited

U.S. PATENT DOCUMENTS 3,819,287 6/1974 Axelsson et al. ............. 24/136 R X

FOREIGN PATENT DOCUMENTS 328225 4/1958 Switzerland ....................... 24/135 R
729594 5/1955 United Kingdom ............. 24/136 R Primary Examiner—James R. Brittain
Attorney, Agent, or Firm—Larry I. Golden

[57] ABSTRACT

An improved conductor clamp adapted to securely clamp conductors having various sized diameters. The clamp includes a first pair of generally rectangular bar clamping members movable in a first direction toward each other and in an opposite direction away from each other. Each of the first pair of clamping members has a generally V-shaped groove extending the length of the member with a contact area extending therefrom. A third clamping member is positioned intermediate the first pair of clamping members. The third clamping member includes a tail portion and a head portion having a conductor contact portion. The third clamping member is positioned and the head portions are configured to be received within the generally V-shaped grooves of the first pair of clamping members such that movement of said first pair of clamping members past a predetermined point toward each other results in the perpendicular directional movement of the third contact members toward the contact areas to readily accommodate and secure conductors of various sizes.

4 Claims, 5 Drawing Sheets

ADJUSTABLE CLAMP FOR CONDUCTORS

RELATED APPLICATIONS

This application is a continuation-in-part of U.S. Application Ser. No. 07/710,494 filed Jun. 5, 1991.

FIELD OF THE INVENTION

The present invention relates to a clamp which is adapted to receive conductors having a range of diameters.

BACKGROUND OF THE INVENTION

Different types of clamps are used for various purposes. For example, there are dead-end cable clamps such as the one shown in U.S. Pat. No. 4,719,672 and there are suspension clamps. There are also parallel groove clamps which support separate conductors in parallel alignment. All these clamps are used to support many different types of electrical cable or fiber optic composite conductors. Although it is a desirable result to apply the clamping force uniformly around the circumference of the conductor, it is difficult to accomplish that result without designing the clamp for a particular sized conductor. Of course, it is very costly to provide a multiplicity of specific clamps for conductors having various diameters. If, on the other hand, the clamp is not designed so as to form fit the conductor, the clamping force is likely provided by compensating with an increased force to draw the opposite clamping members toward each other, resulting in considerable deformation of the conductor in the clamping area. Additional deformation occurs if the clamping faces are not somehow adapted to conform to the particular diameter of the conductor being clamped.

It is particularly important that a fiber optic composite conductor not be substantially deformed during the clamping process. Such a conductor includes a central core with one or more cavities which contain optical fibers. The core provides protection for the optical fibers whose ability to transmit light would be substantially hampered as a result of deformation.

SUMMARY OF THE INVENTION

This invention provides a single clamp which is adapted to receive and clamp a range of circumferentially sized conductors. The clamp embodies three or four operatively associated clamping members which are adapted to provide substantially equal clamping forces around the circumference of the conductor through movement of each clamping member along two perpendicular planes during the clamping process.

It is an object of the invention to provide a cost effective clamp which will hold a large percentage of the conductor's rated strength while causing minimal damage to the conductor or to optical fibers which may be carried by the conductor.

It is a further object of the invention to provide a clamp which is able to accommodate a range of conductor sizes while maintaining an equal distribution of force about the circumference of the conductor.

Other features and advantages of the invention will become apparent to those skilled in the art upon review of the following detailed description, claims and drawings.

DESCRIPTION OF THE PREFERRED EMBODIMENT

Figure 1:
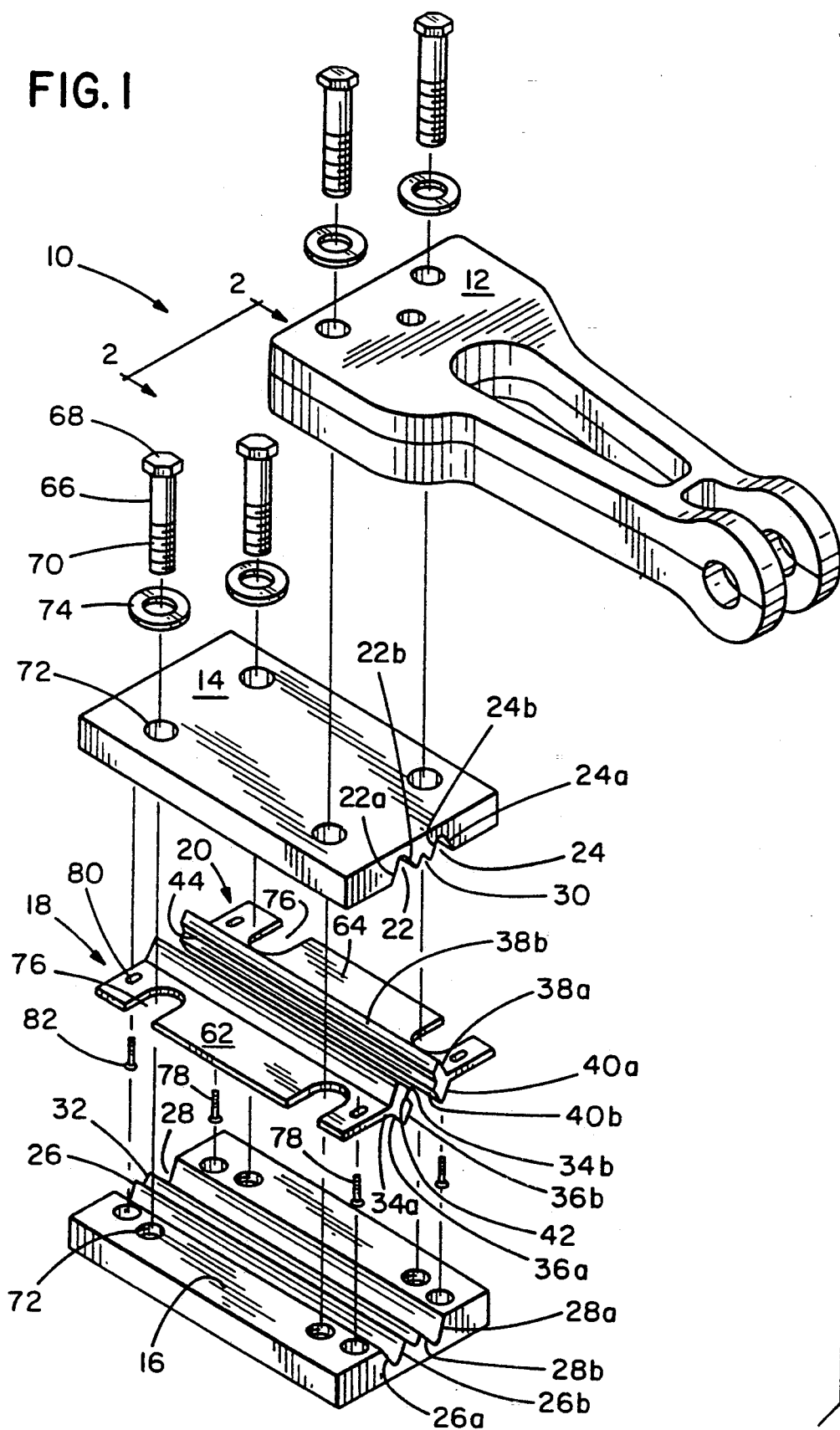
FIG. 1 is an exploded perspective view showing the improved clamp.
Figure 2:
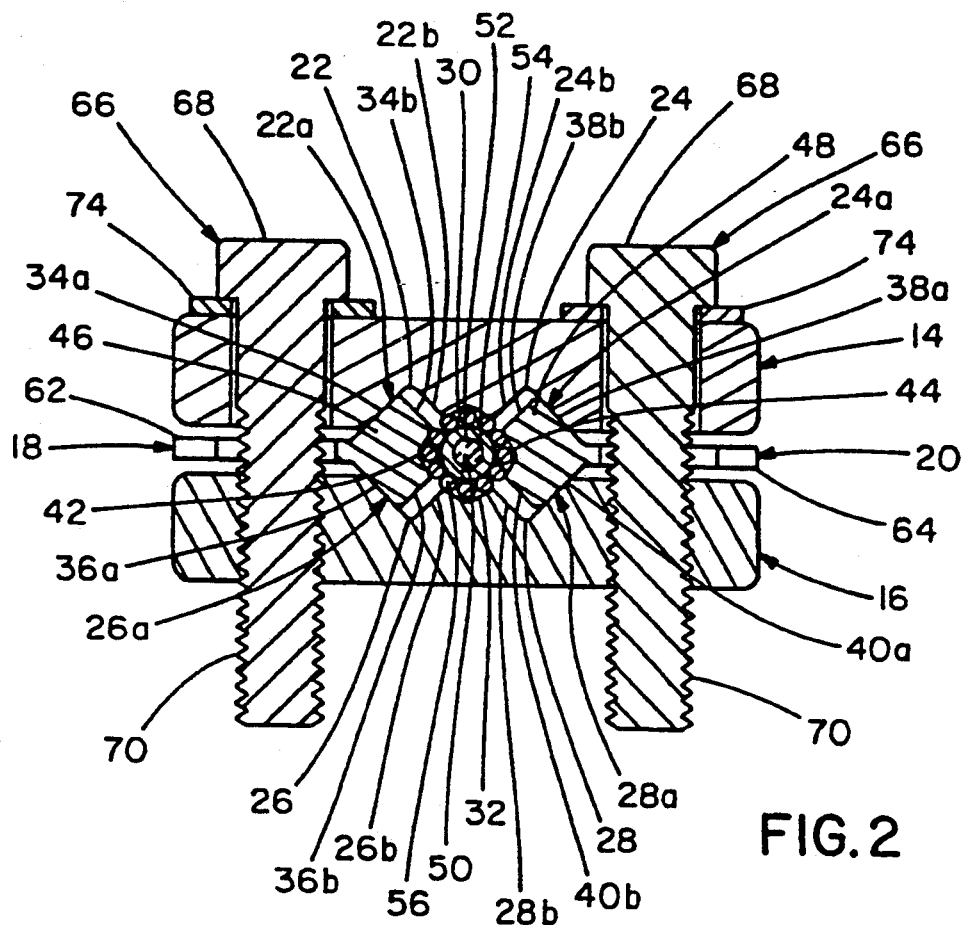
FIG. 2 is a cross sectional view showing the clamp, without the leg portion, in its closed or clamped position taken generally along the line 2—2 of FIG. 1.

A clamp in accordance with this invention is shown in FIG. 1 with a cross sectional view shown in FIG. 2. The clamp is shown as a dead end clamp for use in clamping a fiber optic composite conductor 50 which, as previously mentioned, consists of a central core 52, essentially round in shape, with one or more cavities. Within the cavities, optical fibers 54 are loosely held. On the outside of the core, smaller wires 56 are spirally wound around the core. Those wires offer strength to the conductor and also conduct electricity. The present invention is particularly suited to clamp fiber optic composite conductors although it will be apparent that the invention is also suited to clamp other types of conductors. The clamp 10 is comprised of four heat treated extruded aluminum alloy clamping members which constitute the crux of the invention, and which are hereinafter specifically described, and a leg portion 12 which serves the purpose of securing the clamping members to a support structure when in use for its intended application. The clamping members can be fitted with different types of legs which would allow the clamp to function as either a dead-end clamp or a suspension clamp. By joining the clamping members together in tandem, a parallel groove clamp can be provided. The leg portion can also extend integrally from one end of one of the first pair of clamping members and a sagging eye can be provided at an opposite end.

Figure 3:
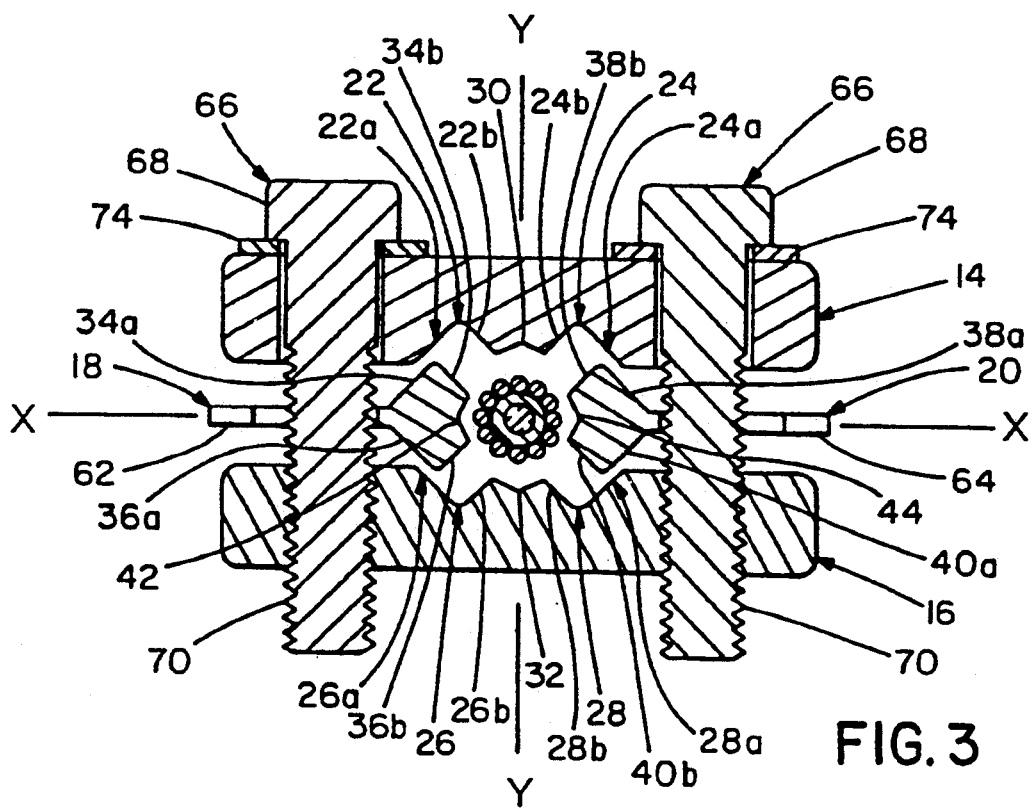
FIG. 3 is a cross sectional view showing the clamp as shown in FIG. 2 in an open position.

A first pair of clamping members 14 and 16 take form of generally rectangular bars positioned to move toward each other and away from each other along a first axis Y as shown in FIGS. 2 and 3. A second pair of clamping members 18 and 20 are positioned intermediate the first pair and associated to move toward and away from each other along a second axis X which is perpendicular to the first axis Y.

Clamping member 14 includes a pair of grooves 22 and 24 which provide mating surfaces 22a, 22b, 24a, and 24b, with surfaces 22a and 24a having substantial interaction with clamping member 18 and 20 respectively as will hereinafter be more specifically described. Similarly, clamping member 16 includes grooves 26 and 28 with mating surfaces 26a, 26b, 28a and 28b, with surfaces 26a and 28a substantially interacting with clamping members 18 and 20 respectively as later addressed. Intermediate the pair of grooves 22 and 24 is a contact portion 30 and intermediate the pair of grooves 26 and 28 is a contact portion 32. The contact portions 30 and 32 are generally V-shaped grooves which receive the conductor 50.

Clamping member 18 includes mating surfaces 34a and 34b which are operatively associated with mating surfaces 22a and 22b on clamping member 14. Clamping member 18 also includes mating surfaces 36a and 36b which are operatively associated with mating surfaces 26a and 26b of clamping member 16. Similarly, clamping member 20 includes mating surfaces 38a and 38b which are operatively associated with mating surfaces 24a and 24b of clamping member 14. Clamping member 20 also includes mating surfaces 40a and 40b which are operatively associated with mating surfaces 28a and 28b of clamping member 16.

Clamping member 18 is provided with a contact portion 42 which spans the space between mating surfaces 34b and 36b and clamping member 20 includes contact portion 44 which spans the space between mating surfaces 38b and 40b.

The contact portions 42 and 44 are generally V-shaped grooves in the head portions 46 and 48 of clamping members 18 and 20, respectively. The clamping members have respective extending tail portions 62 and 64 extending from the head portions 46 and 48 of the clamping members 18 and 20.

As shown in FIGS. 1 and 2, the first pair of clamping members 14 and 16 are connected to each other through the use of bolts 66 or some other retention means. The bolts 66 include a head portion 68 and a threaded shaft portion 70. The bolts extend through openings 72 in the clamp members 14 and 16. The wall portion of opening 72 in clamping member 16 is also threaded for engagement with the threads 70 on the shaft of the bolt and a washer 74 provides spacing between the head portion 68 and the top of clamping member 14. Generally U-shaped notches 76 are also provided in the tail portions 62, 64 of the second clamping member 18 and 20 to receive the shaft portions of the bolts 66.

The second pair of clamping members 18, 20 are retained intermediate the first pair of clamping members 14, 16 by a screw 78 or some other similar retention means which supports the second pair of clamping members to one of the first pair of clamping members 14 while permitting a predetermined amount of movement by the second pair of clamping members along the X axis between a first open position and a second closed or clamped position. The second pair of clamping members is provided with both notches 76 for the bolts 66 as well as with slots 80 which receive the screw 78 and permit limited movement of the second pair of clamping members along the X axis.

The screws, rivets or other fasteners 78 are fixedly retained in the clamp member 14 and loosely extend through the slots 80 which permit movement of the second pair of clamping members 18 and 20. The screws 28 have head portions 82 which retain the clamping members 18 and 20 on the screws and connected to the first clamp member 14. The U-shaped notches 76 and the slots 80 permit limited movement of the second pair of clamping members 18 and 20 along the X axis.

The mating surfaces 22a, 24a, 26a and 28a are at substantially 45° angles with the front face of their respective clamping member with the grooves 22, 24, 26 and 28 having a generally V-shape. Similarly, the head portions 46 and 48 of the clamping members 18 and 20 are inclined at substantially 45° angles and are dimensioned to be nestingly received in the respective grooves 22, 24, 26 and 28.

As can be seen from the Drawings, this configuration and association provides that movement of the first pair of clamping members 14 and 16 towards each other by tightening the bolts 68 imparts movement of the second pair of clamping members 18 and 20, also toward each other an equal distance, with all four clamp members moving toward a common point which coincides with the center axis of the conductor being clamped.

Since each of the contact portions 30, 32, 42 and 44 are substantially V-shaped, each of those portions contact the conductor at two points and provide a total of eight contacts around the circumference of the conductor being clamped. This provides maximum uniform frictional force on the conductor, minimal damage or deformation to the conductor and the ability to clamp a wide range of circumferentially sized conductors with the same clamp.

Alternate embodiments of the parallel groove clamp are shown in FIGS. 4–7. These embodiments, as perhaps best seen in FIGS. 5 and 7, utilize three principal clamping members to clamp the conductor. The association between a first pair of clamping members 14' and 16' and a third clamping member 18' which is positioned intermediate the first pair of clamping members facilitates an improved clamping assembly.

Clamping member 14' is provided with a generally V-shaped groove 84 formed by a pair of mating surfaces 84a and 84b. Similarly, clamping member 16', which is positioned in facing relationship with clamping member 14', is provided with a generally V-shaped groove 86 formed by a pair of mating surfaces 86a and 86b. The grooves 84 and 86 are also positioned in facing relationship to each other and are adapted to nestingly receive the head portion 88 of clamping member 18' which also includes a tail portion 90.

A compartment 92 is formed between the first pair of clamping members as the members are drawn together by tightening the bolt(s) 66'. The third clamping member may be supported by or connected to one of the first pair of clamping members by mechanical means such as the fasteners 78 previously referred to with respect to FIG. 1 or through the use of a foam material 79 having an adhesive on both sides which is positioned between the tail portion of the third clamping member and the clamping member of one of the first pair of clamping members 14'. As the first pair of clamping members are drawn together along the Y axis, the third clamping member is moved in a perpendicular direction along the X axis, thereby reducing the size of the compartment 92 which is adapted to receive the conductor.

A contact area is provided by a pair of contact surfaces 94 and 96 which extend from the groove 84 on the first clamping member 14' while a second contact area is provided by a pair of contact surfaces 98 and 100 which extend from the groove 86 on the second clamping member 16'. The contact areas are positioned in facing relationship with each other as seen in the Drawings. These contact surfaces together with a contact surface 102 provided on the head portion 88 of the third clamping member provide the contact surfaces which securely clamp the conductor when the first pair of clamping members 14' and 16' are drawn together. Surfaces 84a and 86a abutting against surfaces 104 and 106 respectively of the head portion of the third clamping member 18' impart movement of the third clamping member to a clamped position until secure engagement of the conductor is attained or until surfaces 84b and 86b of the first pair of clamping members abut against surfaces 108 and 110 of the head portion of the third clamping member.

Figure 4:
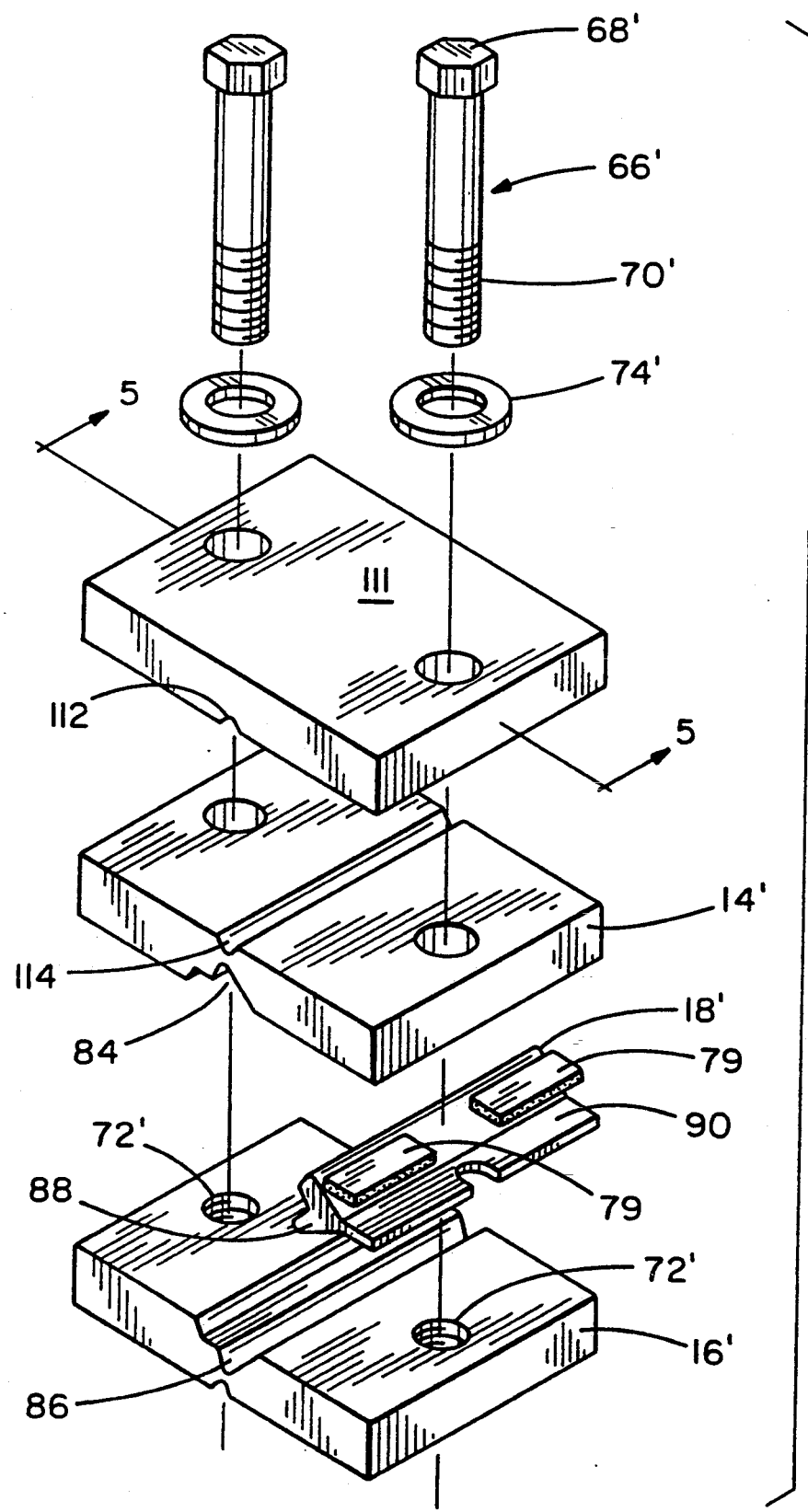
FIG. 4 is an exploded perspective view showing an alternate embodiment of a parallel groove clamp.
Figure 5:
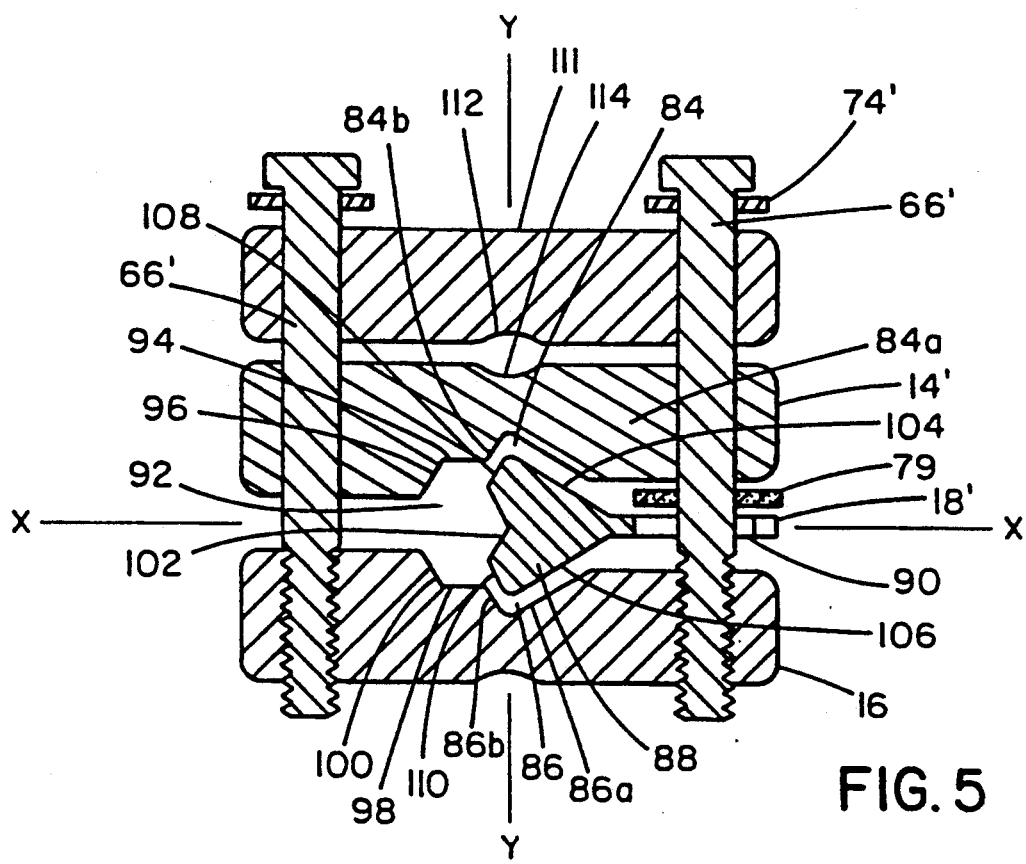
FIG. 5 is a cross sectional view showing the clamp shown in FIG. 4 taken along lines 5—5.

The embodiment shown in FIGS. 4 and 5 includes a fourth clamping member 111 positioned above the first pair of clamping members in club sandwich fashion with a concave surface 112 opposite a concave surface 114 provided in the first clamping member 14' which provides for conventional ground wire retention.

Figure 7:
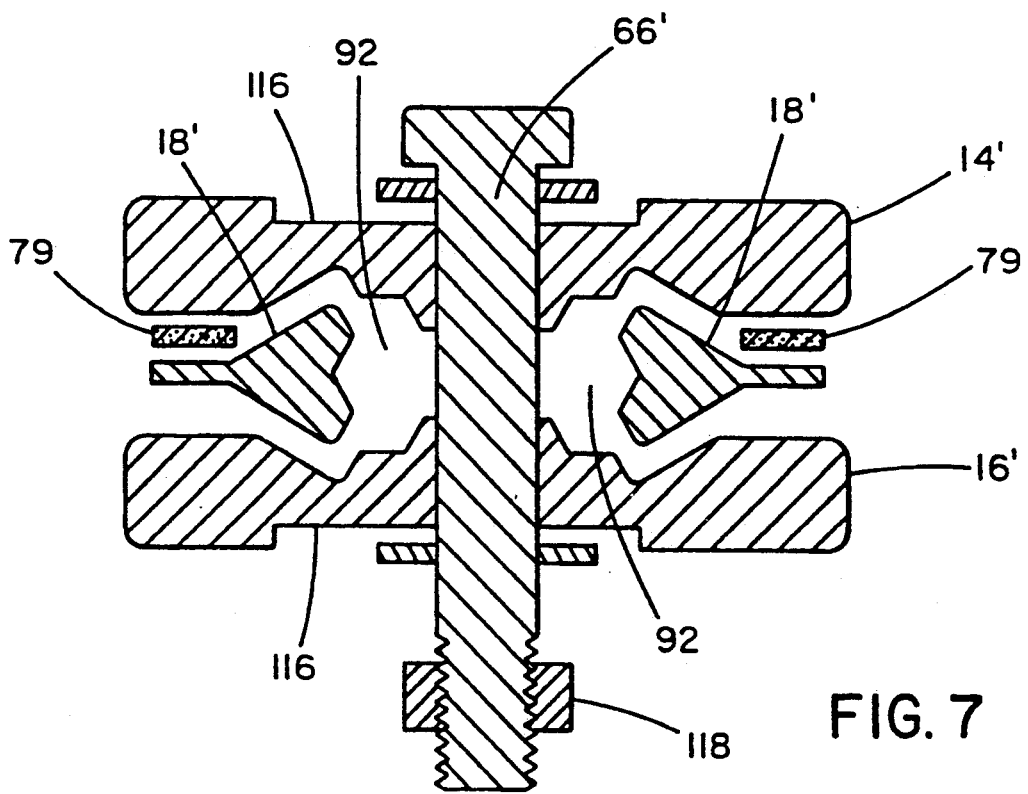
FIG. 7 is a cross sectional view showing the clamp shown in FIG. 6 taken along lines 7—7.
Figure 6:
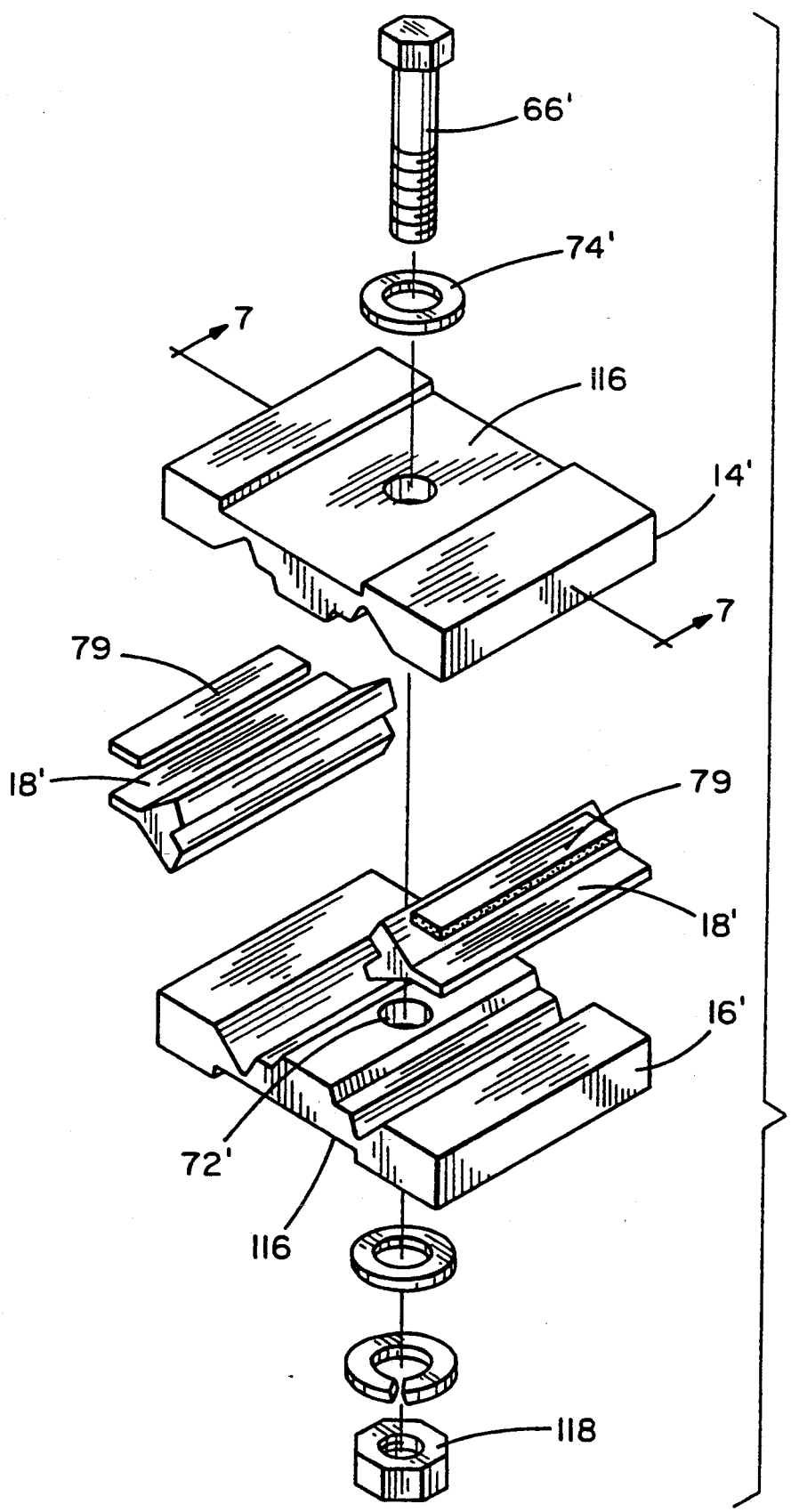
FIG. 6 is an exploded perspective view showing a further alternate embodiment of a parallel groove clamp.

The embodiment shown in FIGS. 6 and 7 carries the conductors in side by side fashion as compared to the top and bottom fashion shown in FIGS. 4 and 5 and also includes channels 116 which will permit a standard ground clamp to nest on the top or bottom of the parallel groove clamp that is shown.

As can be seen, the embodiment shown in FIGS. 6 and 7 utilizes a single bolt 66' with a first pair of clamping members 14' and 16' and a pair of third clamping members 18' which form a pair of compartments 92 for retaining the conductors, one on each side of the bolt 66' as viewed from the cross sectional view in FIG. 7. On the other hand, the embodiment shown in FIGS. 4 and 5 utilizes a double bolt assembly with the conductors in a stacked relationship between the bolts as viewed in the cross sectional view in FIG. 5.

In each of the latter two embodiments the bolts 66' are similarly provided with a head portion 68' and a threaded bottom portion 70' which is threadingly received by threaded openings 72'. Washers 74' are used as appropriate and nuts 118 may be used to secure any of the bolts 66 or 66' in the event it is desirable not to use a threaded opening 72 or 72' in the clamp member 16 or 16'.

It is to be understood that the invention is not limited in its application to the details of construction and description set forth above or illustrated in the drawings. The invention is capable of other embodiments and of being practiced or carried out in various other ways. Also, it is to be understood that the phraseology and terminology used herein is for the purpose of description and should not be regarded as limiting.

I claim:

1. An improved conductor clamp for clamping a conductor comprising:

a first pair of clamping members positioned in facing relationship to each other;

each clamping member of said first pair of clamping members having portions defining a generally V-shaped groove;

each clamping member of said first pair of clamping members further having portions immediately adjacent said groove defining a contact area, said contact area including a pair of contact surfaces adapted to engage said conductor;

said groove and contact area on each clamping member of said first pair of clamping members positioned in facing relationship with each other;

a third clamping member positioned intermediate said first pair of clamping members;

said third clamping member having a head portion including opposite generally V-shaped portions configured to be nestingly received by said groove in each clamping member of said first pair of clamping members and operatively associated to move toward a position of full nesting relationship with said grooves from a position of partial nesting relationship in response to the movement of said first pair of clamping members toward each other;

said head portion of said third clamping member including a portion defining a contact surface, said contact surface being positioned in facing relationship to said contact areas on said first pair of clamping members;

and closing means for moving said first pair of clamping members toward each other.

2. An improved conductor clamp as claimed in claim 1 wherein said closing means comprises a plurality of threaded bolts extending through respective openings in said first pair of clamping members, with each opening in one of said clamping members having a threaded wall portion for threaded engagement with a respective one of said bolts.

3. An improved conductor clamp as claimed in claim 1 including a fourth clamping member positioned above said first pair of clamping members, a pair of longitudinally extending concave surfaces in facing relationship on said fourth clamping member and on one of said first pair of clamping members adapted to receive a ground conductor therebetween.

4. An improved conductor clamp as claimed in claims 1, 2 or 3 wherein said third clamping member includes a tail portion and including a resilient material having opposite adhesive surfaces, said resilient material positioned intermediate said third clamping member and one of said first pair of clamping members with said adhesive portions connected respectively to said tail portion of said third clamping member and a portion of one of said first clamping members.

* * * * *